Dec. 14, 1965    G. H. PORATH    3,223,463
MACHINE TOOL SPINDLE
Filed Jan. 9, 1963    3 Sheets-Sheet 1
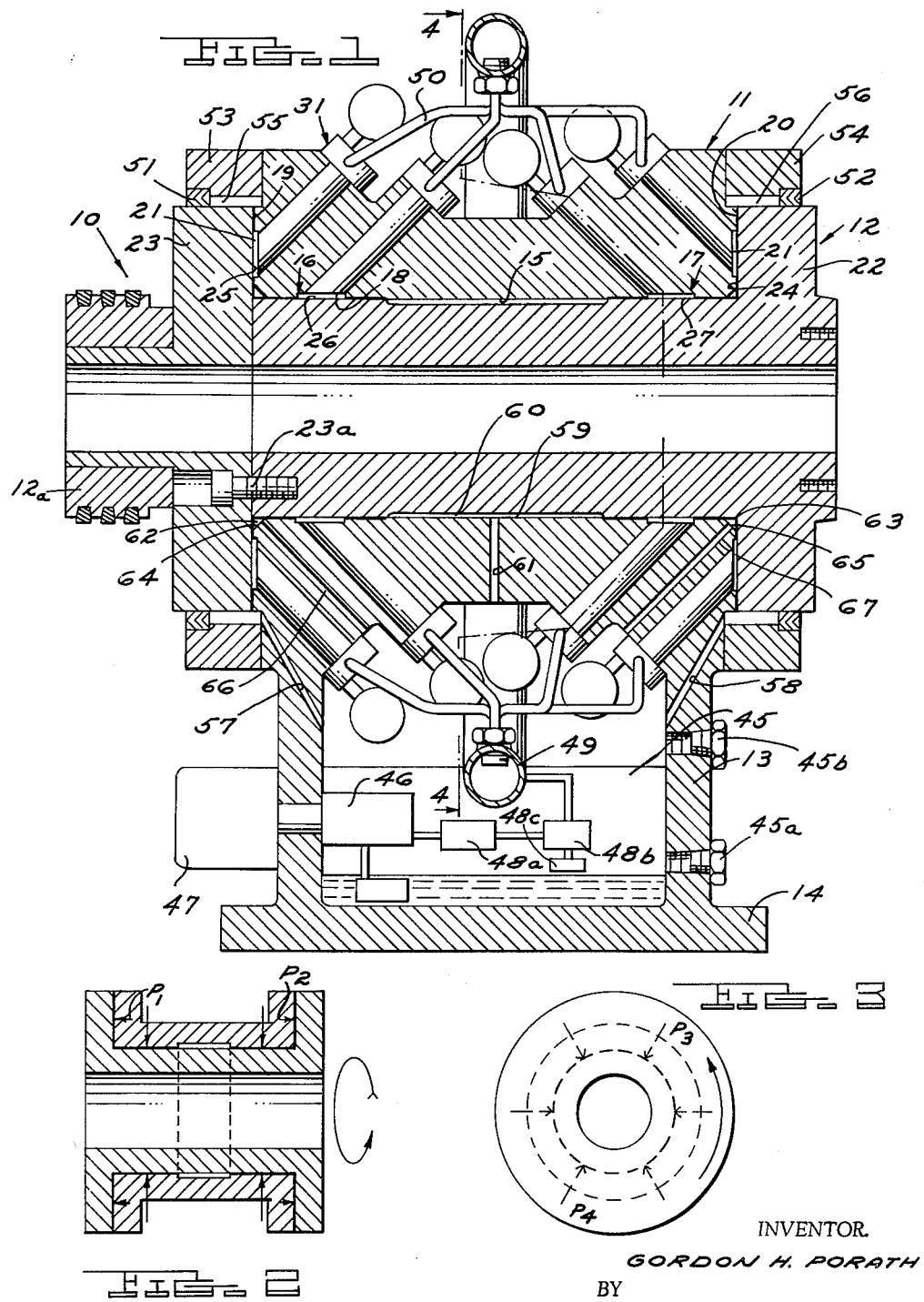
INVENTOR.
GORDON H. PORATH
BY
Barnes, Kisselle, Raisch & Choate
ATTORNEYS

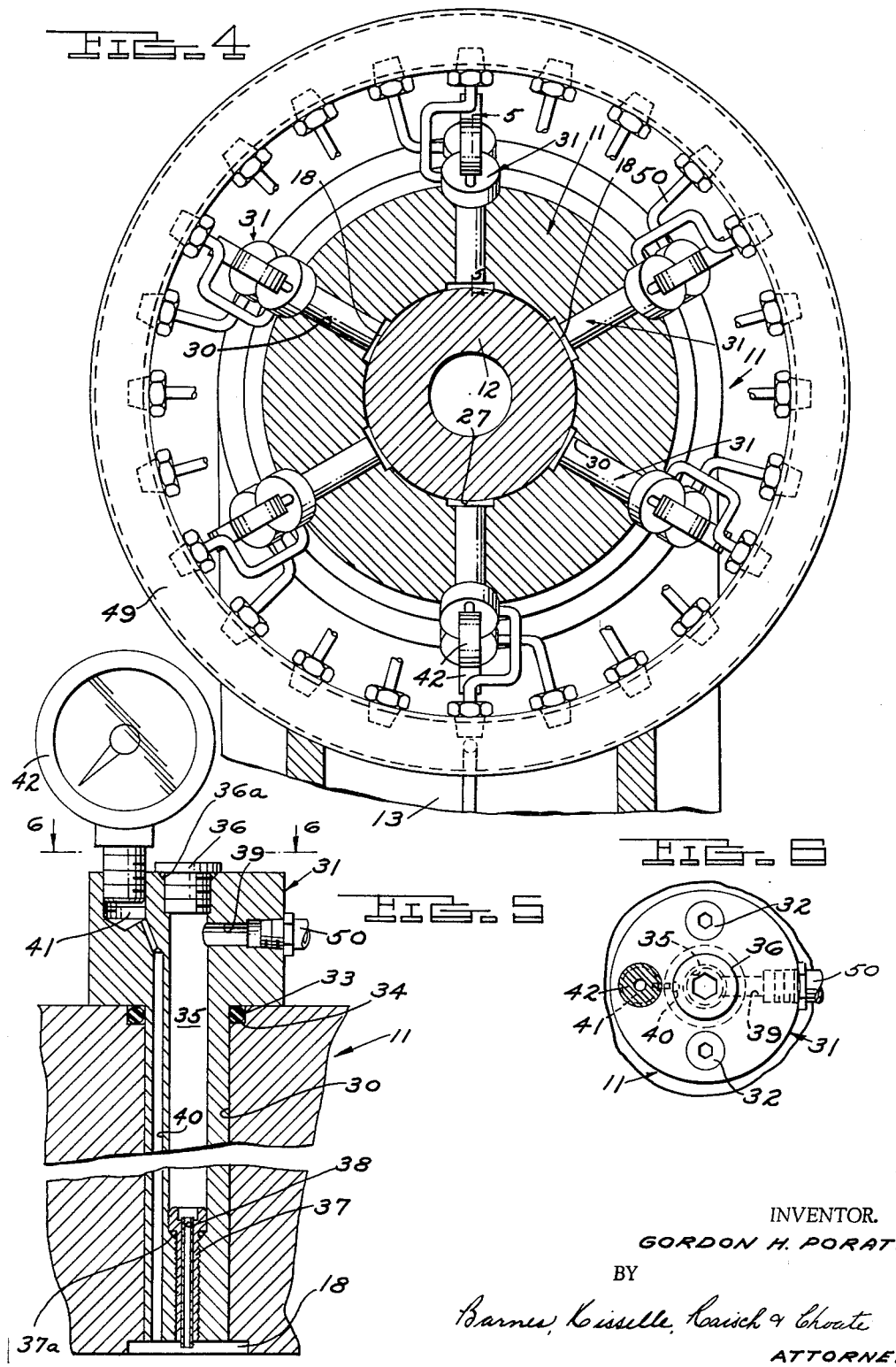

Dec. 14, 1965 G. H. PORATH 3,223,463
MACHINE TOOL SPINDLE
Filed Jan. 9, 1963 3 Sheets-Sheet 3

INVENTOR.
GORDON H. PORATH
BY
Barnes, Kisselle, Raisch & Choate
ATTORNEYS

United States Patent Office 3,223,463
Patented Dec. 14, 1965

1

3,223,463
MACHINE TOOL SPINDLE
Gordon H. Porath, 6101 Concord, Detroit, Mich.
Filed Jan. 9, 1963, Ser. No. 250,384
14 Claims. (Cl. 308—9)

This application is a continuation-in-part of my application Serial No. 173,532, filed February 15, 1962, titled Machine Tool Spindle, and now abandoned.

This invention relates to machine tool spindles and particularly to precision machine tool spindles that may be used for rough and finish machining operations and are rotated at varying high speeds.

A major problem in machine tools such as lathes, milling, boring, grinding, drilling machines and the like is that the workpiece cannot be accurately supported for rotation about a carefully controlled stable axis of rotation. At the present time, it is common to provide machine tools with spindles that have the rotary member therein supported in accurately formed ball or roller bearings. Although by hand selection of the parts ball bearing spindles can have high accuracy, such spindles have the disadvantage that friction between the balls and their races is not eliminated. On the contrary, geometrical inaccuracies, lack of rigidity, dissimilarties in materials which cause Brinelling, misalignment, and random torques tend to increase sliding metal-to-metal friction. Thus such spindles are subject to wear which results in loss of accuracy. Moreover, such spindles must be operated at very light loads only, as for example, finishing operations in order to prevent the wear from occurring too rapidly. In addition, such spindles are subject to vibration noise and deflections because of varying load. Since such spindles must withstand substantial forces, it is necessary to use hard materials which have the deficiency that they have a high coefficient of heat expansion and, therefore, further loss in accuracy is caused when the spindle heats up. A further problem with such machine tool spindles is that there tends to be substantial end play.

Further, attempts have been made to eliminate sliding metal-to-metal friction by the use of the pumping action of the rotary member to maintain an oil film between the bearing surfaces. As the rotary member is rotated, the adhesion of the oil to the rotary member or the viscous drag reaction forms a wedge of oil which tends to flow and encompass the rotary member. As the oil is crowded through the smallest clearance of the rotating member and the journal, the shearing action of the oil builds up a pressure which tends to support the shaft. However, the centering action of the film is only effective at certain relatively higher speeds of rotation. At starting or lower speeds the rotary member is in solid contact with the journal; at very high speeds the whipping action of the rotary member breaks through the oil film. Attempts have been made to use various wedge-shaped shoes and contoured journals but they have not eliminated the problems inherent in such a bearing. The stability of such a bearing is entirely dependent on the speed of rotation. Variations in speed affect the supporting pressure with resultant variation in rotational inaccuracies. This variation occurs especially with shifting loads. During intermittent or reversing motions, the decrease in r.p.m. causes the rotary member to lose its stiffness or stability. A mushy condition results until finally the pumping action is no longer sufficient to support the shaft and metal-to-metal contact occurs.

It is an object of this invention to provide a varying high speed machine tool spindle wherein the axis of rotation of the rotary member is controlled and stable at all speeds within accuracies many times greater than heretofore obtained in machine tool spindles.

It is a further object of the invention to provide such

2 a machine tool spindle in which sliding metal-to-metal friction is completely eliminated and, therefore, the spindle has substantially unlimited life.

It is a further object of the invention to provide such a machine tool spindle which has no random torque characteristics.

It is a further object of the invention to provide such a machine tool spindle which utilizes pressurized liquid from an external source as the load supporting medium between the rotary member and the journal member of the spindle.

It is a further object of the invention to provide such a machine tool spindle which has high and varying load carrying characteristics so that it can be used for both finish machining and rough machining without loss of accuracy.

It is a further object of the invention to provide such a machine tool spindle which is smooth and vibration free.

It is a further object of the invention to provide such a machine tool spindle wherein the rotary member can be made of a relatively soft material having a low coefficient of heat expansion and thereby further increase the accuracy of the spindle.

It is a further object of the invention to provide such a machine tool spindle that has zero end play.

It is a further object of the invention to provide such a machine tool spindle which can be operated at substantially any r.p.m. without loss of accuracy.

It is a further object of the invention to provide such a machine tool spindle wherein inaccuracies in machining of the parts is entirely compensated.

It is a further object of the invention to provide such a machine tool spindle which requires less power to rotate the rotary member because sliding metal-to-metal friction is entirely eliminated.

It is a further object of the invention to provide such a machine tool spindle which utilizes pressured liquid as the load supporting medium wherein the liquid is circulated externally of the journal area so that it can be filtered to remove foreign matter and can have its temperature accurately controlled.

Basically, the invention comprises providing the rotary member of a machine tool spindle within an opening in the housing member which, in turn, has a base so that it can be readily mounted on or made a part of a machine tool. The housing member is formed with an opening through which the rotary member extends and one or more sets of longitudinally spaced pockets or pressure pads are formed along the inner surface of the opening, each set of pads comprising a plurality of circumferentially spaced pads. The housing member also includes radial end surfaces having circumferentially spaced pockets or pressure pads thereon. Viscous liquid under pressure from an external source is supplied to each pad at a predetermined pressure through a metering device, preferably a capillary tube. The rotary member is provided with complementary axial and radial surfaces adjacent the pressure pads. The relative dimensions of the rotary member and housing member are such that the liquid in the pads and the area surrounding the pads supports the spindle. Each capillary tube supplies liquid continuously at predetermined pressure to each pressure pad. The liquid flows in laminar fashion continuously in a thin low velocity film between the adjacent surfaces of the rotary member and housing member preferably in such a manner that the liquid dissipates its pressure by the time it reaches the edges of the surfaces. When the load either axially or radially increases, the rotary member tends to move toward one pad or pads so that the flow of liquid from these pads is restricted; since liquid is being supplied continuously to each pad, the pressure in the pads increases. At the same time, the rotary member tends to move away from an opposite pad or pads, unrestricting the flow and the pressure in these pad or pads decreases. As a result, a pressure differential is created that tends to retain the rotary member in its original position. Because there is never any metal-to-metal contact, there is no wear on any of the parts. The arrangement not only provides for an accurate control of position of the rotary member of the spindle but, in addition, compensates for inaccuracies in the formation of the surfaces.

In the drawings:

FIG. 1 is a longitudinal sectional view through a machine tool spindle embodying the invention.

FIG. 2 is a diagrammatic axial sectional view showing the axial compensation achieved in the machine tool spindle.

FIG. 3 is a diagrammatic end view representing the radial compensation achieved in the machine tool spindle.

FIG. 4 is a sectional view taken substantially along the line 4—4 in FIG. 1.

FIG. 5 is a fragmentary sectional view on an enlarged scale taken along the line 5—5 in FIG. 4.

FIG. 6 is a sectional view taken along the line 6—6 in FIG. 5.

Figure 7:
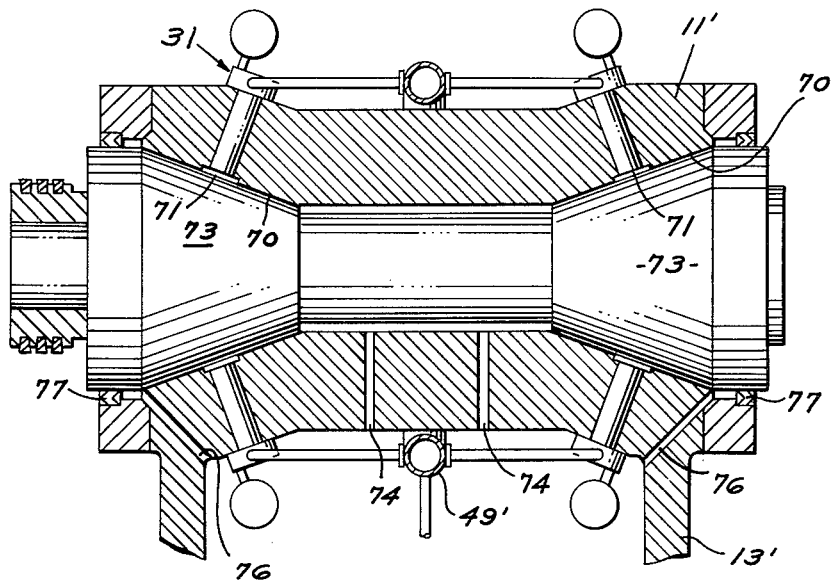
FIG. 7 is a partly diagrammatic axial sectional view of a modified form of machine tool spindle.

Referring to FIGS. 1 and 4, machine tool spindle 10 comprises a housing member 11 and a rotary member 12. Housing member 11 includes a base 13, the lowest portion of which is flanged as at 14 so that the spindle can be readily mounted on a machine tool. A pulley or similar drive member 12a is mounted on rotary member 12 so that it can be driven at varying high speeds.

As shown in FIG. 1 housing member 11 includes an axial opening 15 therethrough through which the rotary member 12 extends. Opening 15 is cylindrical and includes one or more sets of pockets or pressure pads 18, herein shown as two sets 16, 17 spaced longitudinally along the opening 15. Each pressure pad comprises a recess in the surface 15 to which liquid is supplied at a predetermined pressure as presently described.

Housing member 11 also includes radially extending end thrust surfaces 19, 20, each of which has a plurality of circumferentially spaced pockets or pressure pads 21 therein, each pressure pad constituting a depression in the surface. Liquid under predetermined pressure is also supplied to pressure pads 21, as presently described. Rotary member 12 includes radial thrust flange 22, which can be a separate member but is herein shown as integral, at one end and a radial thrust flange 23 at the other end, herein shown as separable and held on by bolts 23a. Thrust flanges 22, 23 define surfaces 24, 25 respectively, adjacent the surfaces 19, 20 of the housing member 12. In addition, rotary member 12 includes cylindrical surfaces 26, 27 adjacent the sets 16, 17 of pressure pads 18 in the side of the opening 15.

Any viscous liquid such as a machine oil is supplied at constant pressure to each pressure pad from an external pressure source by orifice or metering units 31.

All metering units 31 are similar and, for purposes of clarity, only one metering unit 31 will be described. Referring to FIGS. 5 and 6, housing member 11 includes an opening 30 extending from each pad 18, 21 to the periphery of the housing member. A metering unit 31 extends into and substantially fills each opening 30 and is held in position on the housing member 11 by screws 32 (FIG. 6). An O-ring 33 in a recess 34 in the housing member provides a seal between the metering unit 31 and the housing member 11.

The body of the orifice unit 31 includes a passageway 35 extending from the pad 18 or 21 through to the surface of the metering unit. A sealing plug 36 closes the end of the passageway, an O-ring 36a being interposed between the plug 36 and unit 31. An Allen-head screw 37 is threaded into the base of the passageway 35 and an O- ring 37a is interposed between the head of screw 37 and the unit 31. Screw 37 supports a capillary tube 38 in position to provide an orifice for throttling the liquid and supplying it at a predetermined pressure to the pressure pad. The capillary tube is mounted in an opening through screw 37 by silver soldering the tube at its ends to the screw 37. Liquid is supplied to the passage 35 through an inlet 39.

Metering unit 31 also includes a second passage 40 extending from the pad 18 parallel to passageway 35 to a connecting opening 41 into which a pressure gauge 42 is threaded so that the pressure gauge at all times indicates the pressure in the pad 18. As previously indicated, a metering unit 31 is provided for each pad 18, 21 in the housing member 11.

Liquid is supplied at predetermined constant volume and pressure to the inlet 39 of each metering unit 31 as more fully shown in FIG. 1. As shown in FIG. 1, base 13 is hollow to define a chamber or a reservoir 45 for liquid. Drain and filler plugs 45a, 45b are provided for reservoir 45. The liquid is pumped by a pump 46 driven by an external motor 47 through a filter 48a and pressure relief valve 48b into a circular endless conduit or manifold 49 that extends completely around the journal member 11 through the walls of the reservoir 45. The manifold 49, in turn, is connected to each metering unit 31 by conduits 50. A heat exchanger 48c is provided on the by-pass side of pressure relief valve 48b. In this manner, the pump 46 continuously supplies fluid at a predetermined pressure to each metering unit 31 and the capillary tube in each metering unit, in turn, drops the pressure of the viscous liquid to a predetermined value and supplies it to its respective pad. For example, liquid in manifold at 100 pounds per square inch is dropped by the capillaries to 50 pounds per square inch in each pressure pad. The pressures in the pads in each set of pads are equal.

The relative dimensions of the adjacent surfaces of the housing member 11 and the rotary member 12 are such that a laminar film of liquid flows continuously at low velocity between the surfaces and the pressure of the liquid drops to zero as it leaves the surfaces. The number and size of the pressure pads is such as to support the load on the rotary member 12 and will vary depending upon the size of the load to be supported. A minimum of three circumferentially spaced pads is required. The space between the surfaces 19 and 25, 20 and 24, 15 and 27, 15 and 26 may range between two-thousandth (0.002) of an inch and one ten-thousandth (0.0001) of an inch and preferably between one-thousandth (0.001) of an inch and one ten-thousandth (0.0001) of an inch. In larger size spindles where machining limitations prevent obtaining uniform control of dimensions, satisfactory results will be achieved provided that at least some portions of the spaces between the surfaces are within the above limits.

The relative dimensions are designed such that a thin film of liquid flows at all times in laminar fashion at low velocity between the adjacent surfaces and preferably substantially all of the pressure of the liquid is dissipated by the time the liquid has passed from the pad to the periphery of the surface in question.

In order to provide for the return of the liquid to the reservoir 45, peripheral seals 51, 52 extend between axial flanges 53, 54 on the journal member 11 and the periphery of the radial thrust flanges 22, 23 of the rotary member to define annular collecting chambers 55, 56 to which the liquid flows. These chambers are drained to the reservoir 45 through drain openings 57, 58 in the base. An annular drain passage 59 is provided at the center of the opening 15 by a cutaway portion 60 on the shaft of the rotary member 12. The annular drain passage could be provided at the center of opening by a cut-away portion in journal member 11. Drain opening 61 extends from this space 59 to the reservoir 45. In addition, annular drain passages 62, 63 are provided at each end of opening 15 by cut-away portions 64, 65. Drain openings 66, 67 extend from passages 62, 63 to reservoir 45.

Use of capillary tubes for metering liquid flow has proved excellent. Fixed orifices, another good method, present several problems that are eliminated with capillary tubes. With a fixed orifice there is a tendency over a long period of time of the small sharp cornered metering holes to wear; whereas, in comparison the long hole in a capillary tube never wears. Further, a considerably larger diameter hole can be used in a capillary tube because of the length, greatly relaxing filtering requirements. Finally, capillary tubes cancel any effects of change in viscosity of the liquid. In the formulas used to calculate the bearing, the viscosity of the fluid cancels out on both sides of the equations. This condition allows the use of any suitable liquid regardless of viscosity without changing bearing performance.

In designing the machine tool spindle, the pressure pads are so located relative to the adjacent surfaces that the liquid has substantially an equal distance to flow from the pad to the collecting area where it enters a drain chamber for draining back to the reservoir.

The provision of a low velocity laminar flow of liquid between the surfaces of the journal member and rotary member effectively eliminates any friction because there is no metal-to-metal contact and provides a machine tool spindle that will compensate for loads that are inadvertently applied thereon to thereby maintain a stable accurate axis of rotation. Due to the symmetrical liquid flow pattern and the very low velocity laminar flow, the rotary member is free of any random torque characteristics which tend to rotate it.

The gauges 42 provide a visual indication at all times of the pressure in the pads. If a capillary should become clogged, the pressure will immediately drop to zero. The capillary can then be readily removed and cleaned. Gauges 42 also assist in checking the pressures in the pads during manufacture of the spindle. If the pressures in the pads of any set of pads are not equal, then the size of the capillaries can be changed to make certain that the pressures in the pads in that set are balanced. Varying the size of the hole or the length or both of the capillary tube changes the amount of liquid that passes through the tube with a resultant change of pressure in the pressure pad.

The manner of operation of the machine tool spindle can be more readily understood by referring to FIGS. 2 and 3. FIG. 2 represents the relative arrangement provided by the pressure pads 21. In the event that a thrust force is applied on the rotary member 12, for example to the right as shown in FIG. 2, the pressure in the pad represented by the arrow $P_1$ increases because of the restricting action and the pressure in the opposed pad represented by the arrow $P_2$ decreases because of the unrestricting action so that a force is applied on the rotary member 12 to the left tending to return the rotary member to its initial position. In the event that a radial force is applied to the rotary member 12 tending to move it off center, as for example down and to the left as shown in FIG. 3, the pressure $P_4$ in one pad will increase because of the restricting action and the pressure in the opposed pad $P_3$ will decrease tending to provide a force upwardly and to the right to return the rotary member 12 to its original position. Because the spindles are designed with internal supporting pressures far in excess of applied loads and because of the minute clearance dimensions, it can be readily understood that the relative movements herein described are very slight. In fact, they are so slight that they cannot be measured.

This arrangement not only compensates for varying forces on the rotary member but, in addition, will compensate for varying forces because of change in position of the machine tool spindle. Moreover, the fully compensated flow will accommodate for minor surface or machining inaccuracies that inherently occur in commercial machining practices, producing an ultra-precise, stable, smooth, vibration-free axis of rotation.

The machine tool spindle embodying the invention thereby provides a very accurate control of the axis of the rotary member which has no wear thereon and will therefore maintain its accuracy indefinitely. The load carrying characteristics of the machine tool spindle including resistance to shock permits its use for both finish and rough machining work so that one spindle can serve the purposes of what have heretofore required a plurality of spindles. Loads which would normally damage machine tool spindles utilizing ball and roller bearings do not damage machine tool spindles embodying the invention.

Since there is no metal-to-metal contact, the parts can be made of a softer material to take advantage of the low coefficient of heat expansion of softer materials such as Invar. The spindle construction permits accurate control of the temperature of the liquid, as by heat exchanger 48c so that the spindle parts can be maintained at constant temperature.

Because the liquid is continuously moving outwardly from the spindle and filtered, the spindle surfaces can not be contaminated by foreign matter when the spindle is used in dirty operating conditions.

A modified form of machine tool spindle is shown in FIG. 7 wherein, instead of providing pressure pads on axial and radial thrust surfaces of the housing member 11', the housing member 11' is formed with frusto conical end surfaces 70 which extend axially and radially outwardly. Pressure pads 71 are provided on surfaces 70 and liquid under pressure is supplied to each pressure pad 71 by metering units 31. Rotary member 12' is provided with complementary surfaces 73. In this form, loads which tend to move rotary member 12' are compensated for by the pads, both thrust and radial load being compensated for by the same pads. The liquid is returned to the base 13' through drain openings 74 and 76. Seals 77 on the ends of the spindle collect the liquid and direct it to openings 76.

The macchine tool spindle not only provides for radial but, in addition, thrust compensation of loads so that there is zero end play on the rotary member.

I claim:
1. In a machine tool spindle adapted to rotate at varying high speeds,
  the combination comprising a rotary member adapted to be driven at varying high speeds,
  a housing member having an opening therethrough through which the rotary member extends,
  said housing member having a base whereby said spindle may be readily mounted on a machine tool,
  said housing member having at least one set of spaced pads along the inner surface of the opening,
  said set comprising a plurality of circumferentially spaced pressure pads,
  said housing member including radial end thrust surfaces facing axially outwardly in opposite directions,
  a plurality of circumferentially spaced pressure pads associated with each said radial end thrust surface,
  an orifice associated with each pressure pad and
  means for supplying liquid under pressure to each said orifice,
  said rotary member having made of two separable sections,
  one said section of said rotary member including generally axial surfaces complementary to the surfaces in which said set of pressure pads is positioned,
  the said sections of said rotary member having complementary radial surfaces facing and adjacent the radial surfaces of said housing member,
  the pressure of liquid in the pads of each set of pads being equal,
  said pads being located relative to one another and said surfaces such that the liquid flows substantially equal distances from said pads and the pressure of said liquid is substantially dissipated as the liquid reaches the edges of said surfaces, said housing having drain passages at the edges of the surfaces through which the liquid flows, the relative dimensions of said housing and said rotary member being such that a pressurized film of liquid flows continuously between the surfaces through the pressure pads so that forces on the rotary member are balanced by pressures in the pressure pads providing a permanent stable separation of the surfaces and retaining the rotary member in a stable position relative to the housing member.

2. The combination set forth in claim 1 wherein said base of said housing member is hollow defining a reservoir for liquid, said drain passages extending to said reservoir, said means for supplying liquid to each said orifice comprising a pump operable independently of said rotary member in said base and conduits extending from said pump to each said orifice.

3. The combination set forth in claim 2 including a manifold to which the pump supplies liquid.

4. In a machine tool spindle adapted to rotate at varying high speeds, the combination comprising a rotary member adapted to be driven at high speeds, a housing member having an opening therethrough through which the rotary member extends, said housing member having at least one set of pressure pads along the inner surface of the opening, each said set comprising a plurality of circumferentially spaced pressure pads, said housing member including radial end thrust surfaces, a plurality of circumferentially spaced pressure pads associated with each said surface, an orifice unit associated with each pressure pad, means for supplying liquid under pressure to each said orifice, said rotary member including generally axial surfaces complementary to the surfaces in which said sets of pressure pads are positioned, said rotary member having complementary radial surfaces overlying and adjacent the radial surfaces of said housing member, the pressure of liquid in the pads of each set of pads being equal, the relative dimensions of said housing and said rotary member being such that a pressurized film or liquid flows continuously between the surfaces through the pads so that forces on the rotary member are balanced by pressures in the pads providing a permanent stable separation of the surfaces and retaining the rotary member in a stable position relative to the housing member, each said orifice unit comprising a member removably mounted in said housing member, said member having a radially inner end thereof adjacent its respective pressure pad, said member including a passage therein communicating with said pressure pad, a capillary tube in said passage, a second passage therein communicating with said pressure pad, and a gauge associated with said second passage for indicating the pressure of liquid in said pressure pad.

5. The combination set forth in claim 4 including a screw having a hole therethrough in which said capillary tube is positioned.

6. The combination set forth in claim 5 wherein said orifice member includes an access opening providing access to the end of said screw, and means for sealing the end of said access opening.

7. In a machine tool spindle adapted to rotate at varying high speeds, the combination comprising a rotary member adapted to be driven at varying high speeds, a housing member having a cylindrical opening therethrough through which the rotary member extends, said housing member having at least one set of pressure pads along the inner surface of the opening, said set comprising a plurality of circumferentially spaced pressure pads, said housing member including annular radial end thrust surfaces facing axially outwardly in opposite directions, a plurality of circumferentially spaced pressure pads associated with each said radial end thrust surface, an orifice associated with each pressure pad, means for supplying liquid under pressure to each said orifice, said rotary member being made of two separable sections, one said section comprising a cylindrical portion and a radial portion adjacent one end of said cylindrical portion, the other section comprising a radial portion fixed on the other end of said cylindrical portion, said cylindrical portion of said rotary member including generally axial cylindrical surfaces complementary to the surfaces of said housing member in which said set of pressure pads is positioned, said radial portions of said sections of said rotary member having complementary annular radial end thrust surfaces facing and adjacent the radial surfaces of said housing member, the pressure of liquid in the pads of each set of pads being equal, said pads being located relative to one another and said surfaces such that the liquid flows substantially equal distances from said pads and the pressure of said liquid is substantially dissipated as the liquid reaches the edges of said surfaces, said housing having drain passages at the edges of the surfaces through which the liquid flows, the relative dimensions of said housing and said rotary member being such that a pressurized film of liquid flows continuously between the surfaces through the pads so that forces on the rotary member are balanced by pressures in the pads providing a permanent stable separation of the surfaces and retaining the rotary member in a stable position relative to the housing member.

8. In a machine tool spindle adapted to rotate at varying high speeds, the combination comprising a rotary member adapted to be driven at varying high speeds, a housing member having an opening therethrough through which the rotary member extends, said housing member having at least two sets of pressure pads along the inner surface of the opening, each said set comprising a plurality of circumferentially spaced pressure pads, said housing member including radially extending end thrust surfaces at right angles to the axis thereof and facing axially outwardly in opposite directions, a plurality of circumferentially spaced pressure pads associated with each said radial end thrust surface, an orifice in said housing member associated with each pressure pad, means for supplying liquid under pressure to each said orifice, said rotary member being made of two separable sections, one said section comprising a cylindrical portion and radial portion adjacent one end of said cylindrical portion, the other said section comprising a radial portion fixed on the other end of said cylindrical portion, said cylindrical portion of said rotary member including generally axial surfaces complementary to the surfaces of said housing member in which said sets of pressure pads are positioned, said radial portions of said sections of said rotary member having complementary radial end thrust surfaces facing and adjacent the radial end thrust surfaces of said housing member, the pressure of liquid in the pads of each set of pads being equal, said pads being located relative to one another and said surfaces such that the liquid flows substantially equal distances from said pads and the pressure of said liquid is substantially dissipated as the liquid reaches the edges of said surfaces, said housing having drain passages at the edges of the surfaces through which the liquid flows, the relative dimensions of said housing and said rotary member being such that a pressurized film of liquid flows continuously between the surfaces through the pads so that forces on the rotary member are balanced by pressures in the pads providing a permanent stable separation of the surfaces and retaining the rotary member in a stable position relative to the housing member.

9. In a machine tool spindle adapted to rotate at varying high speeds, the combination comprising a rotary member adapted to be driven at varying high speeds, a housing member having an opening therethrough through which the rotary member extends, said housing member having a base whereby said spindle may be readily mounted on a machine tool, said base being hollow and forming a liquid reservoir, said housing member having at least one set of pressure pads along the inner surface of the opening, each said set comprising a plurality of circumferentially spaced pressure pads, said housing member including radially extending end thrust surfaces facing axially outwardly in opposite directions, a plurality of circumferentially spaced pressure pads associated with each said radial end thrust surface, an orifice associated with each pressure pad, means for supplying liquid under pressure from said reservoir to each said orifice comprising a separably operable pump in said housing, said rotary member being made of two separable sections, one said section of said rotary member including generally axial surfaces complementary to the surface in which said set of pressure pads is positioned, each said section of said rotary member having complementary radial surfaces facing and adjacent the radial surfaces of said housing member, the pressure of liquid in the pads of each set of pads being equal, said pads being located relative to one another and said surfaces such that the liquid flows substantially equal distances from said pads and the pressure of said liquid is substantially dissipated as the liquid reaches the edges of said surfaces, the relative dimensions of said housing and said rotary member being such that a pressurized film of liquid flows continuously between the surfaces through the pads so that forces on the rotary member are balanced by pressures in the pads providing a permanent stable separation of the surfaces and retaining the rotary member in a stable position relative to the housing member, said rotary member having drain openings extending from adjacent said pressure pads to said reservoir, and means providing seals between the ends of said rotary member and the ends of said housing member whereby all the liquid supplied to said pressure pads drains back into said reservoir.

10. An orifice unit for providing liquid to a pressure pad in a bearing comprising a member adapted to be removably mounted in a housing member, said member having an end thereof adapted to be adjacent its respective pad, said member including a passage therein communicating with said end, a capillary tube in said passage, a second passage therein communicating with said end, and a gauge associated with said second passage for indicating the pressure of liquid in the pad adjacent said end.

11. The combination set forth in claim 10 including a screw having a hole therethrough in which said capillary tube is positioned.

12. The combination set forth in claim 11 wherein said orifice member includes an access opening providing access to the end of said screw, and means for sealing the end of said opening.

13. In a machine tool spindle adapted to rotate at varying high speeds, the combination comprising a rotary member adapted to be driven at varying high speeds, a housing member having an opening therethrough through which the rotary member extends, said housing member having a base whereby said spindle may be readily mounted on a machine tool, said housing member having at least one set of spaced pads along the inner surface of the opening, said set comprising a plurality of circumferentially spaced pressure pads, said housing member including radial end thrust surfaces facing axially outwardly in opposite directions, a plurality of circumferentially spaced pressure pads associated with each said radial end thrust surface, an orifice associated with each pressure pad and means for supplying liquid under pressure to each said orifice, said rotary member being made of two separable sections, one said section of said rotary member including generally axial surfaces complementary to the surfaces in which said set of pressure pads is positioned, the said sections of said rotary member having complementary radial surfaces facing and adjacent the radial surfaces of said housing member, the pressure of liquid in the pads of each set of pads being equal, said pads being located relative to one another and said surfaces such that the liquid flows substantially equal distances from said pads and the pressure of said liquid is substantially dissipated as the liquid reaches the edges of said surfaces, said housing having drain passages at the edges of the surfaces through which the liquid flows, the relative dimensions of said housing and said rotary member being such that a pressurized film of liquid flows continuously between the surfaces through the pressure pads so that forces on the rotary member are balanced by pressures in the pressure pads providing a permanent stable separation of the surfaces and retaining the rotary member in a stable position relative to the housing member, said base of said housing member being hollow defining a reservoir for liquid, said drain passages extending to said reservoir, said means for supplying liquid to each said orifice comprising a pump operable independently of said rotary member in said base and conduits extending from said pump to each said orifice, a manifold to which the pump supplies liquid, said manifold comprising an annular tube surrounding said housing member.

14. In a machine tool spindle adapted to rotate at varying high speeds,
the combination comprising a rotary member adapted to be driven at varying high speeds,
a housing member having an opening therethrough through which the rotary member extends,
said housing member having a base whereby said spindle may be readily mounted on a machine tool,
said housing member having at least one set of spaced pads along the inner surface of the opening,
said set comprising a plurality of circumferentially spaced pressure pads,
said housing member including radial end thrust surfaces facing axially outwardly in opposite directions,
a plurality of circumferentially spaced pressure pads associated with each said radial end thrust surface,
an orifice associated with each pressure pad and means for supplying liquid under pressure to each said orifice,
said rotary member being made of two separable sections,
one said section of said rotary member including generally axial surfaces complementary to the surfaces in which said set of pressure pads is positioned,
the said sections of said rotary member having complementary radial surfaces facing and adjacent the radial surfaces of said housing member,
the pressure of liquid in the pads of each set of pads being equal,
said pads being located relative to one another and said surfaces such that the liquid flows substantially equal distances from said pads and the pressure of said liquid is substantially dissipated as the liquid reaches the edges of said surfaces,
said housing having drain passages at the edges of the surfaces through which the liquid flows,
the relative dimensions of said housing and said rotary member being such that a pressurized fiilm of liquid flows continuously between the surfaces through the pressure pads so that forces on the rotary member are balanced by pressures in the pressure pads providing a permanent stable separation of the surfaces and retaining the rotary member in a stable position relative to the housing member,
said base of said housing member being hollow defining a reservoir for liquid,
said drain passages extending to said reservoir,
said means for supplying liquid to each said orifice comprising a pump operable independently of said rotary member in said base and conduits extending from said pump to each said orifice,
a manifold to which the pump supplies liquid,
a gauge associated with each said orifice for indicating the pressure of the liquid supplied in each pressure pad.

References Cited by the Examiner
UNITED STATES PATENTS

| | | | |
|---|---|---|---|
| 824,187 | 6/1906 | Lowe | 308—122 |
| 1,906,715 | 5/1933 | Penick | 308—9 |
| 2,578,711 | 12/1951 | Martellotti | 308—122 |
| 2,822,223 | 2/1958 | Offen. | |
| 2,919,960 | 1/1960 | Whitney | 308—122 |
| 2,998,999 | 9/1961 | Morser et al. | 308—122 |

DAVID J. WILLIAMOWSKY, *Primary Examiner.*

FRANK SUSKO, *Examiner.*